United States Patent [19]
Toyoda et al.

[11] Patent Number: 5,175,786
[45] Date of Patent: Dec. 29, 1992

[54] DISTRIBUTED REFRACTIVE INDEX TYPE OPTICAL TRANSMISSION PLASTIC ARTICLE AND METHOD OF MANUFACTURING THE SAME

[75] Inventors: Nobuhiko Toyoda; Yoshihiko Mishina; Ryuji Murata; Yoshihiro Uozu; Masaaki Oda; Teruta Ishimaru, all of Otake, Japan

[73] Assignee: Mitsubishi Rayon Company Ltd., Tokyo, Japan

[21] Appl. No.: 689,942

[22] PCT Filed: Sep. 29, 1989

[86] PCT No.: PCT/JP89/00990
§ 371 Date: May 29, 1991
§ 102(e) Date: May 29, 1991

[87] PCT Pub. No.: WO91/05274
PCT Pub. Date: Apr. 18, 1991

[51] Int. Cl.⁵ .................. G02B 6/18; G02B 6/04
[52] U.S. Cl. .................. 385/124; 359/652; 250/370.08
[58] Field of Search .............. 350/96.24, 96.25, 96.27, 350/96.31, 413; 250/370.08, 370.09; 385/115, 116, 120, 121, 123, 124; 359/652, 653, 654

[56] References Cited

U.S. PATENT DOCUMENTS

| | | | |
|---|---|---|---|
| 4,331,380 | 5/1982 | Rees et al. | 350/96.25 |
| 4,435,039 | 3/1984 | Lama et al. | 350/96.25 |
| 4,589,736 | 5/1986 | Harrigan et al. | 350/413 |
| 4,799,761 | 1/1989 | Yamamoto et al. | 350/96.31 |
| 4,878,234 | 10/1989 | Pfeiffer et al. | 250/370.09 X |

FOREIGN PATENT DOCUMENTS 0242636 10/1987 European Pat. Off. .
62-209402 9/1987 Japan .
62-215204 9/1987 Japan .

OTHER PUBLICATIONS

Applied Optics, vol. 21, No. 15, Aug. 1982, pp. 2739-2746, W. Lama "Optical Properties of Grin Fiber Lens Arrays: Dependence of Fiber Length".

Primary Examiner—Akm E. Ullah
Attorney, Agent, or Firm—Oblon, Spivak, McClelland, Maier & Neustadt

[57] ABSTRACT

A distributed refractive index type optical transmission plastic article has a circular cross section of a radius $r_0$ between 0.4 and 0.6 mm. A refractive index distribution of the optical transmission article substantially approximates predetermined ideal refractive index distribution curve at least in a range of $0.25r_0$ to $0.70r_0$ extending from a center axis toward a peripheral face of the article. The article has a refractive index $n_0$ between 1.4 and 1.6 for its central part, a refractive index distribution constant between 0.3 and 0.7 mm$^{-1}$, and a modulation transfer function (MTF) of at least 55%. This optical transmission article is made from uncured liquid substances each having a viscosity between $10^3$ and $10^8$ poises and refractive indexes n of $n_1 > n_2 > n_3 \ldots n_N$ when cured. N ($N \geq 3$) of such uncured liquid substances are arranged in such a way that the refractive indexes n successively decrease from a central portion toward a peripheral portion, and concentrically laminated one upon the other to form an uncured strand fiber. The substances between adjacent layers of the fiber are mutually diffused, and at the same time or thereafter, the uncured strand fiber is cured, thereby completing the production of the optical transmission article.

7 Claims, 5 Drawing Sheets

DISTRIBUTED REFRACTIVE INDEX TYPE OPTICAL TRANSMISSION PLASTIC ARTICLE AND METHOD OF MANUFACTURING THE SAME

TECHNICAL FIELD

The present invention relates to an optical transmission article and a method of manufacturing the same, which is useful for optical transmission lines such as near parabolic optical fibers, rod-like convergent lenses, and photosensors.

BACKGROUND ART

Optical transmission articles each with refractive indexes gradually distributed from the center toward the periphery on a cross-section thereof are disclosed in Japanese Examined Patent Publication No. 47-816, Japanese Examined Patent Publication No. 47-28059, and European Patent Publication No. 0208159.

The distributed refractive index type optical transmission article disclosed in Japanese Examined Patent Publication No. 47-816 is made of glass and fabricated by an ion exchange method. This method has a poor productivity and cannot produce an article having an identical shape (an identical length, in particular) and an identical performance. Even with an identical performance, the fabricated distributed refractive index type optical transmission articles have uneven lengths, and thus problems arise with handling thereof.

The distributed refractive index type optical transmission plastic article disclosed in Japanese Examined Patent Publication No. 47-28059 is made by mixing two or more transparent polymers having different refractive indexes and different solubilities with respect to a particular solvent. The mixed polymers are shaped into a rod or a fiber, and immersed in the solvent to extract a part of the polymers from the surface thereof, thereby changing a mixing ratio of the polymers from the surface toward the center thereof. Since the refractive index distributed type optical transmission plastic article of this method is made of a mixture of two or more polymers having different refractive indexes, fluctuations in the refractive indexes of the article occur deteriorating the transparency, and causing light scattering, and therefore, the article cannot serve as the distributed refractive index type optical transmission article. Accordingly, little improvement can be expected in the application and development of this method.

European Patent Publication No. 0208159 describes a method in which (A) at least one kind of thermoplastic polymer and (B) a monomer which is compatible with the polymer (A) when polymerized and forms a polymer having a refractive index different from that of the polymer (A), are mixed and formed into a rod-like shape. From the surface of the shaped body, the monomer (B) is volatilized to continuously distribute the monomer (B) from the surface toward the interior of the formed article, and thereafter, the non-polymerized monomer in the shaped body is polymerized to form a distributed refractive index type optical transmission plastic article.

An ideal refractive index distribution curve of the distributed refractive index type optical transmission article is expressed as follows:

$$N = N_0 (1 - ar^2)$$

This curve is considered to be the same as a curve "a" of FIG. 2.

According to studies and measurements made by the inventor, using an Interfaco interference microscope under conditions to be explained later, however, the distributed refractive index type optical transmission article fabricated according to the above-mentioned method provides a refractive index distribution curve "b" of FIG. 2. In a range of 0.5 $r_0$ to 0.75 $r_0$ of radial distances from the center (i.e., in a range of c to d in the figure, with e being an outermost part), the curve b is relatively close to the ideal curve expressed by the equation (1). At the outer and inner sides of the above range, however, the refractive index distribution is greatly deviated from the ideal curve.

When a grid pattern is observed through these optical transmission articles, if the optical transmission article has a refractive index pattern which almost correctly follows the quadratic curve defined by the equation (1), the article will provide a normal grid image as shown in FIG. 3(a). If, however, the refractive index distribution of the optical transmission article deviates from the ideal refractive index distribution, as indicated by (b) of FIG. 2, the article will provide a distorted grid image as shown in FIGS. 3(b) and 3(c), since the article cannot transmit an incorrect image. In this case, a moderation transfer factor (MTF) indicating the resolution of the article is also very low, i.e., less than 30% which is not acceptable for use as an optical transmission article of a facsimile.

Accordingly, the conventional refractive index distributed type optical transmission article with the refractive index distribution as shown by (b) of FIG. 2 must be cut or eluted by a solvent process to remove a portion outer than the position (d) of FIG. 2, thereby providing the optical transmission article with an optical path having a relatively ideal refractive index distribution. It is, however, difficult to provide an optical transmission article with a high resolution, and thus the productivity thereof is very low, and it is very difficult to constantly produce articles having a uniform quality.

DISCLOSURE OF THE INVENTION

An object of the invention is to provide a distributed refractive index type optical transmission plastic article which can be applied to a facsimile and an image sensor employing a monochromatic light source and has a high resolution and a less chromatic aberration.

The invention provides a distributed refractive index type optical transmission plastic article having a circular cross section of a radius $r_0$ and a refractive index distribution which substantially approximates a refractive index distribution curve defined by the following equation (1), at least in a range of $0.25r_0$ to $0.70r_0$ extending from a center axis toward a peripheral face of the optical transmission article:

$$n(r) = n_0 \{1 - (g^2/2)r^2\} \qquad (1)$$

where $n_0$ is a refractive index at a center axis portion of the optical transmission article;

$n(r)$ is a refractive index at a position of a radius r away from the center axis of the optical transmission article;

g is a refractive index distribution constant ($mm^{-1}$) of the optical transmission article; and r is a distance (mm) from the center axis toward the periphery of the optical transmission article, wherein, $$1.4 \leq n_0 \leq 1.6$$

$$0.4 \leq r_0 \text{ (mm)} \leq 0.6$$

$$0.3 \leq g \text{ (mm}^{-1}) \leq 0.7$$

wherein when a grid image of 4 line-pairs/mm is formed through the optical transmission article on a CCD line sensor and a maximum value $i_{max}$ and a minimum value $i_{min}$ of light quantities of the image are measured, the article has a modulation transfer function (hereinafter referred to as the MTF) of not less than 55% calculated according to the following equation (2):

$$MTF = \{(i_{max} - i_{min})/(i_{max} + i_{min})\} \times 100 \qquad (2)$$

The invention also provides a method of manufacturing the distributed refractive index type optical transmission plastic article. This method employs N (N≦3) uncured liquid substances each having a viscosity of between $10^3$ and $10^8$ poises and refractive indexes n of $n_1 > n_2 > n_3 \ldots n_N$ when cured, concentrically laminates the substances in such a way that the refractive indexes are successively reduced from the center toward the periphery of the laminated substances to form an uncured strand fiber, mutually diffuses the substances between adjacent layers in such a way that the refractive indexes are continuously distributed between the layers, and at the same time or thereafter, cures the uncured strand fiber.

BEST MODE OF CARRYING OUT THE INVENTION

Figure 1:
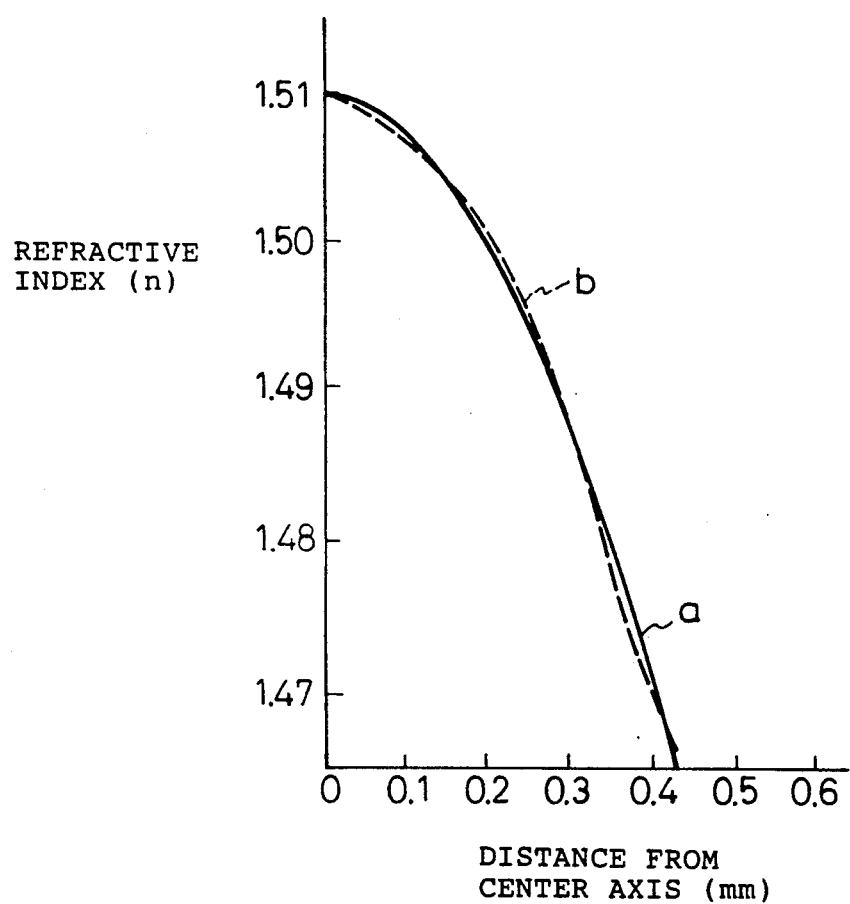
FIG. 1 shows a refractive index distribution curve of an example of distributed refractive index type optical transmission articles of the invention.
Figure 2:
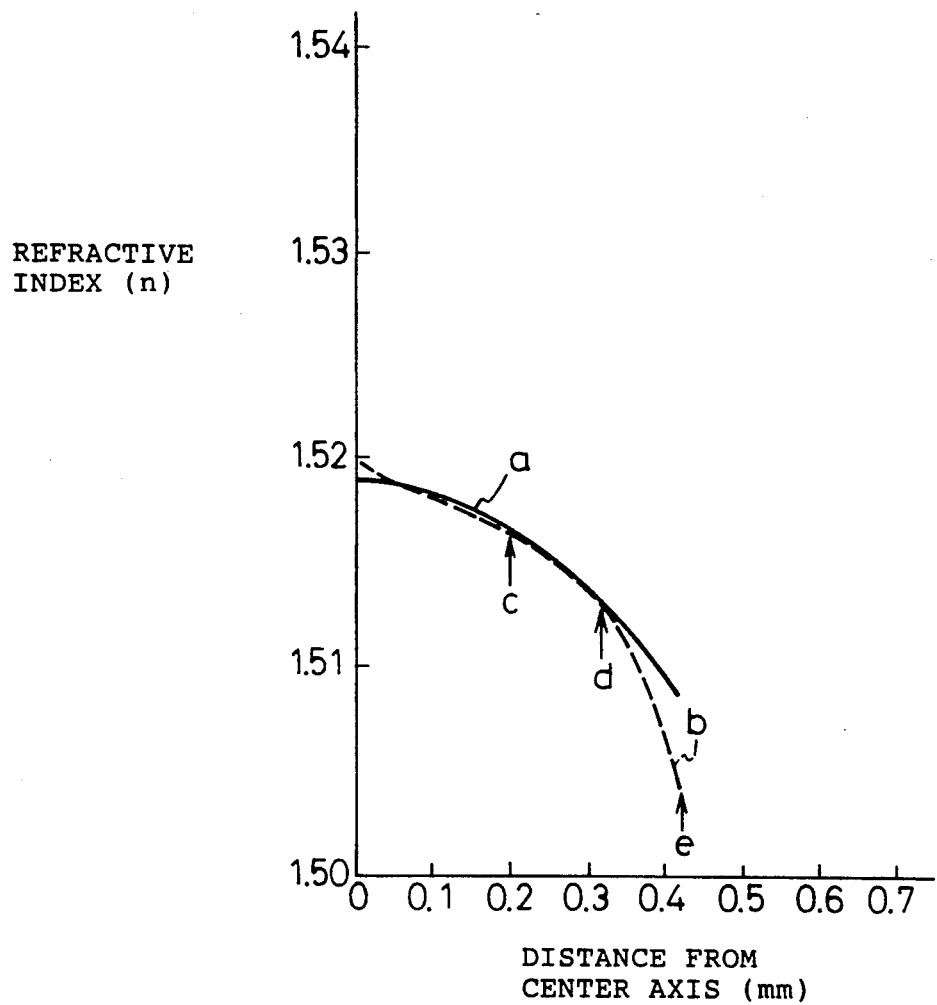
FIG. 2 shows a refractive index distribution curve of a distributed refractive index type optical transmission plastic article formed according to a prior art method.
Figure 3A:
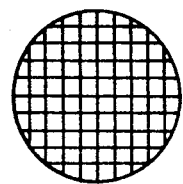
FIGS. 3a-3c are views of examples of grid images obtained by these optical transmission articles.
Figure 3B:
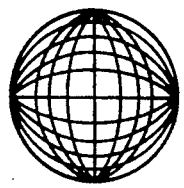
Figure 3C:
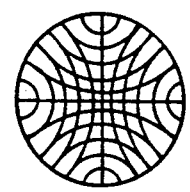

As indicated by (b) of FIG. 1, a refractive index distribution curve of the optical transmission article of the invention must substantially approximate the ideal refractive index distribution curve ((a) of FIG. 1) expressed with the equation (1), at least in a range of $0.25r_0$ to $0.70r_0$, preferably $0.20r_0$ to $0.75r_0$, from a center axis of the article. The distributed refractive index type optical transmission article of the invention involving the above-mentioned range which agrees with the ideal refractive index distribution defined by the equation (1) provides a nearly correct image of a grid observed with the optical transmission article, even if the refractive index distribution of the optical transmission article relatively deviates from the refractive index distribution curve defined by the equation (1) in a region ranging from the center axis to $0.25r_0$ or in a region outside $0.70r_0$.

The distributed refractive index type optical transmission plastic article of the invention must have a value $n_0$ of $1.4 \leq n_0 \leq 1.6$. If the value exceeds 1.6, the optical transmission plastic article is difficult to produce, and if the value $n_0$ is smaller than 1.4, a difference of refractive indexes at the center axis and at the periphery of the article cannot be enlarged, to thus realize an optical transmission article having an excellent resolution and image transmitting characteristics.

A value g is defined by the following equation (3):

$$g = \sqrt{2(N_0 - N_r)/(N_0 \times r^2)} \qquad (3)$$

which defines a lens length and an image forming length. If the value g is greater than 0.7 mm$^{-1}$, the image forming length of the optical transmission article will be too short to provide uniform characteristics. If the value g is smaller than 0.3 mm$^{-1}$, the resolution of the optical transmission article will be too low to be used for a facsimile or an image scanner.

When the distributed diffraction index type optical transmission plastic article of the invention is used for a facsimile, etc., a plurality of such articles instead of a single article thereof are usually arranged in a single row or a plurality of rows in a zigzag manner, to form an array of the optical transmission articles in which images provided by the articles partly overlap each other to form an image. The visibility of the overlapped images depends on the degree of overlapping, which is influenced by the diameter of each optical transmission article. To obtain a clear image, a radius $r_0$ of the optical transmission article must be in a range of 0.4 to 0.6 mm. If the article is thinner than this, the article may have an insufficient brightness and be difficult to produce with a uniform refractive index distribution. If the article is thicker than the above range, the images provided by the array of the optical transmission articles may unevenly overlap each other, and thus will not transmit clear images. By setting the MTF of the array over 40%, the array can transmit clearer and brighter images.

Figure 4:
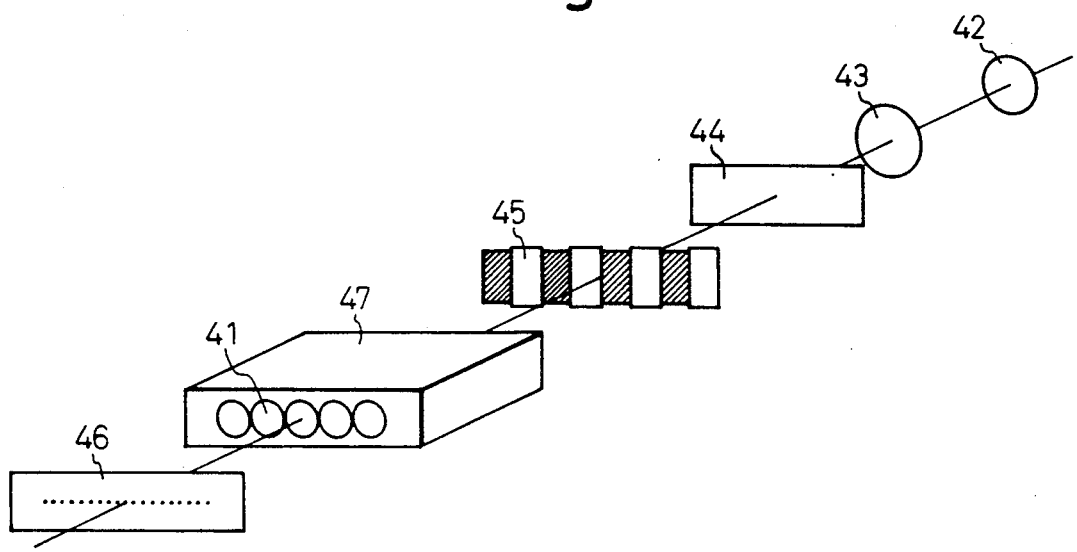
FIG. 4 is a schematic view of an apparatus for measuring the resolution of an optical transmission article.
Figure 5:
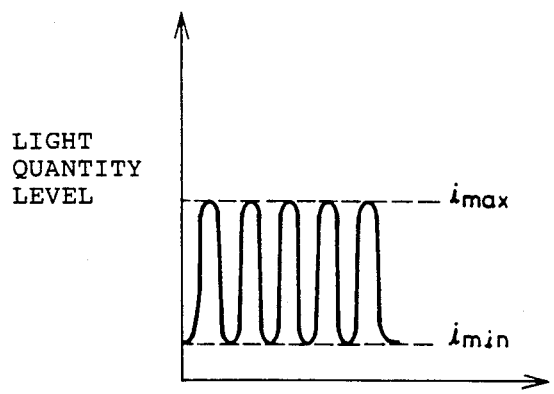
FIG. 5 is a graph of the light quantity levels of a grid image measured with a CCD sensor.

The MTF which indicates resolution of the distributed refractive index optical transmission plastic article of the invention can be determined as follows. Namely, as shown in FIG. 4, a light source 42, a filter 43, a diffusion plate 44, a grid 45, and an array 47 composed of a plurality of distributed refractive index type optical transmission articles 41 form a resolution measuring apparatus. A grid image having a spatial frequency of 4 (line-pairs/mm) is passed through the optical transmission articles 41 to form an image on a CCD line sensor 46. The formed grid image is read, and a maximum value $(i_{max})$ and a minimum value $(i_{min})$ of light quantities of the image are measured as shown in FIG. 5. According to the measured $i_{max}$ and $i_{min}$, the MTF is calculated according to the $i_{max}$ and $i_{min}$ with the following equation (2):

$$MTF(\%) = \{(i_{max} - i_{min})/(i_{max} + i_{min})\} \times 100 \qquad (2)$$

where the grid constant is the number of lines per millimeter (line-pairs/mm), in which each line comprises a pair of white and black lines as shown on the grid 45 of FIG. 4.

The MTF of the distributed refractive index type optical transmission plastic article of the invention must be not less than 55%. If the MTF is smaller than 55%, the optical transmission article provides a low resolution and cannot form a clear image when applied to a copying machine such as a facsimile.

The distributed refractive index type optical transmission plastic article of the invention may be fabricated in the following manner:

N (N≧3) uncured liquid substances each having a viscosity of between $10^3$ and $10^8$ poises in an uncured state and refractive indexes n of $n_1 > n_2 > n_3 \ldots n_N$ in a cured state are prepared, and these uncured liquid substances are concentrically laminated, one upon the other, in such a way that the refractive indexes are successively reduced from the center toward the periphery of the laminated substances, thereby forming an uncured strand fiber. The substances of the strand fiber are then mutually diffused between adjacent layers to provide a continuous refractive index distribution between the layers, during which or thereafter the uncured strand fiber is cured.

If a difference of $n_1 - n_N$ between the central and outermost layers of the distributed refractive index type optical transmission article is enlarged with N being 2, it will be difficult to approximate the refractive index distribution of the article to the curve defined by the equation (1), in the range of $0.25 r_0$ to $0.75 r_0$ from the center of the article, and the optical transmission article of the invention will hardly be obtained. Accordingly, N must be 3 or greater than 3, preferably 3 to 7, and more preferably 3 to 5.

When carrying out the invention, each of the uncured liquid substances must have a viscosity between $10^3$ and $10^8$ poises and be curable. If the viscosity is smaller than $10^3$ poises, the strand will be easily broken and hardly form a strand-like shape. If the viscosity is greater than $10^8$ poises the substance will have a poor processability which will lead to a deterioration of the concentricity or forming of irregular diameters.

The liquid substances to be employed when carrying out the invention may be radical polymerizable vinyl monomers, or compositions comprising the monomers and polymers that are soluble with the monomers.

The radical polymerizable vinyl monomers to be used are, for example, methyl methacrylate (n=1.49), styrene (n=1.59), chlorstyrene (n=1.61), vinyl acetate (n=1.47), fluorized alkyl(meta)acrylate (n=1.37 to 1.44) such as 2,2,3,3-tetrafluoropropyl(meta)acrylate, 2,2,3,3,4,4,5,5-octafluoropropyl(meta)acrylate, 2,2,3,4,4,4-hexafluoropropyl(meta) acrylate, and 2,2,2-trifluoroethyl(meta)acrylate, and (meta)acrylates having a refractive index between 1.43 and 1.62 such as ethyl(meta)acrylate, phenyl(meta)acrylate, benzyl(meta)acrylate, hydroxylalkyl(meta)acrylate, alkyleneglycoldi(meta)acrylate, trimethylolpropane-di or -tri(meta)acrylate, pentaerythritol-di, -tri, or -tetra(meta)acrylate, diglycerintetra(meta)acrylate, dipentaerythritolhexa(meta)acrylate, as well as diethyleneglycolbisallylcarbonate, fluorized alkyleneglycolpoly(meta)acrylate, etc. In order to adjust the viscosities of these uncured liquid substances and make the distribution of the refractive indexes of an obtained strand fiber from the center toward the outside of the strand fiber, the uncured liquid substances are preferably composed of vinyl-based monomers and soluble polymers. The polymer to be used must have a good compatibility with polymers produced from the radical polymerizable vinyl monomers. The polymers are, for example, poly(methyl methacrylate) (n=1.49), poly(methylmethacrylate)-based copolymer (n=1.47 to 1.50), poly-4-methylpenten-1 (n=1.46), ethylene/vinyl acetate copolymer (n=1.46 to 1.50), polycarbonate (n=1.50 to 1.57), poly(vinylidene fluoride) (n=1.42), vinylidene fluoride/tetrafluoroethylene copolymer (n=1.42 to 1.46), vinylidene fluoride/tetrafluoroethylene/hexafluoropropene copolymer (n=1.40 to 1.46), and poly(alkylfluoride) (meta) acrylate polymer.

To adjust the viscosities, it is preferable to use polymers having an identical refractive index for respective layers, because an optical transmission plastic article having refractive indexes continuously distributed from the center toward the surface of the article can be formed. In particular, poly(methyl methacrylate) has an excellent transparency and a high refractive index, and therefore, is preferably used for producing the distributed refractive index type optical transmission article of the invention.

To cure the strand fiber formed from the uncured substances, it is preferable to add a thermosetting catalyst and/or photocatalyst to the uncured substances. The fiber strand containing the thermosetting catalyst and/or photocatalyst is heated or irradiated with light, preferably ultraviolet light.

The thermosetting catalyst may be a peroxide-based catalyst, and the photopolymerization catalyst may be benzophenone, benzoinalkylether, 4'-isopropyl-2-hydroxy-2-methyl-propiophenone, 1-hydroxycyclohexylphenylketone, benzylmethylketal, 2,2-diethoxyacetophenone, chlorothioxanthone, thioxanthone-based compounds, benzophenone-based compounds, 4-dimethylaminobenzoic ethyl, 4-dimethylaminobenzoic isoamyl, N-methyldiethanolamine, triethylamine, etc.

The light source used for the photopolymerization may be a carbon arc lamp, a high-pressure mercury lamp, an ultra-high-pressure mercury lamp, a low-pressure mercury lamp, a chemical lamp, a xenon lamp, or a laser beam, etc., emitting light having a wavelength of 150 to 600 nm.

Figure 6:
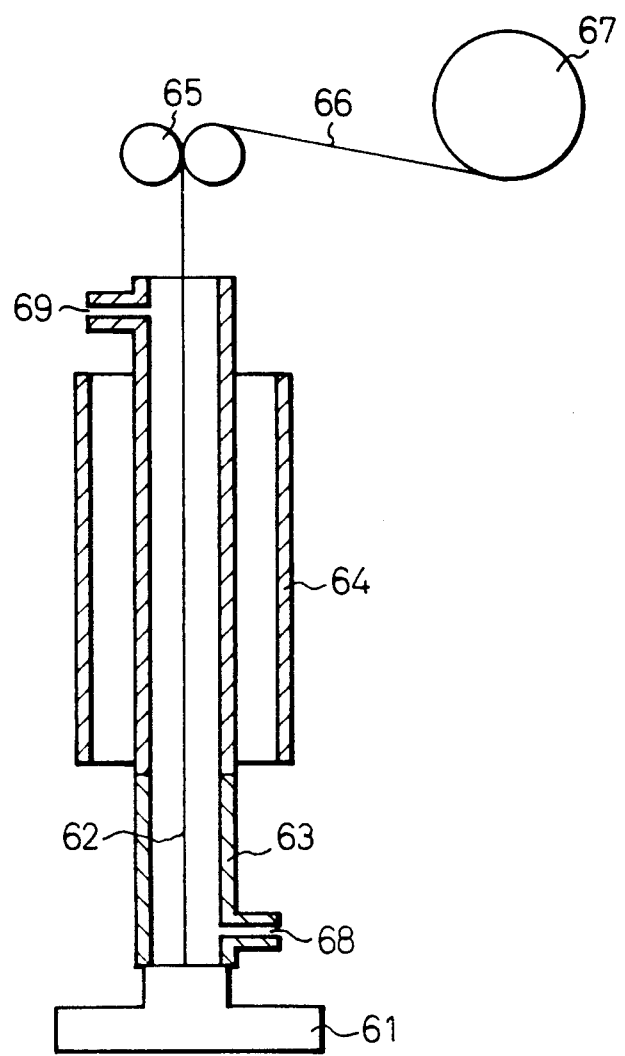
FIG. 6 is a schematic view of an apparatus preferably used for forming the distributed refractive index type optical transmission plastic article of the invention.

To prepare the optical transmission article of the invention, a strand fiber forming apparatus shown in FIG. 6, for example, may be used. A concentric composite nozzle 61 extrudes an uncured strand fiber 62, which is passed through a mutual diffusion portion 63 for mutually diffusing monomers of respective layers of the strand fiber to impart a refractive index distribution, as well as through a curing portion 64 for curing the uncured substances. The strand fiber is then passed between pulling rollers 65, and wound, as a distributed refractive index type optical transmission plastic article 66, around a winding portion 67. To remove volatilizing substances released from the strand fiber 62 from the mutual diffusion portion 63 and from the curing portion 64, an inert gas such as a nitrogen gas is introduced from an inert gas introducing port 68, and discharged from a discharging port 69.

The invention will be explained in more detail with reference to Examples.

The lens capacities and refractive index distributions of the Examples were measured as follows:

I. Measurement of lens capacities

Evaluation apparatus

Figure 7:
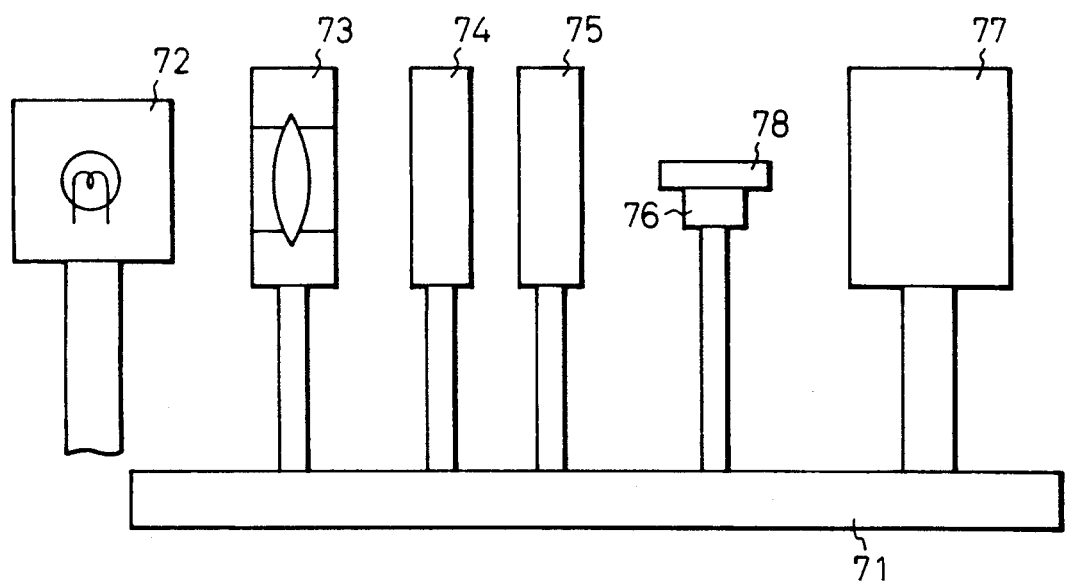
FIG. 7 is a schematic view of a lens capacity measuring apparatus.

The lens capacities were measured with an evaluation apparatus shown in FIG. 7.

Preparation of samples

Each optical transmission article prepared according to the Examples was cut to a length of about one fourth ($\lambda/4$) of a period ($\lambda$) of a light beam. The period ($\lambda$) was determined from the wave form of a He-Ne laser beam passing through the article. The article was then polished with a polisher to make both end faces of the sample parallel to each other and orthogonal to a longitudinal axis, and thus a sample to be evaluated was obtained.

Measuring method

As shown in FIG. 7, a sample table (76) was placed on an optical bench (71), and a sample (78) to be evaluated was placed on the sample table (76). A diaphragm (74) was adjusted so that light from a light source (72) passes through a condenser lens (73), the diaphragm (74), and a glass plate (75) and entirely irradiates an end face of the sample. Thereafter, the sample (78) and a Polaroid camera (77) were adjusted so that the light was focused on a film in a Polaroid (a trademark of the Polaroid company) camera. An image of a square grid was photographed, and a distortion of the grid was observed. The glass plate (75) was a chrome-plated photomasking glass, the chrome film on which was precisely processed to form a square grid pattern of 0.1 mm.

II. Measurement of refractive index distribution

An Interfaco interference microscope made by the Carl Zeiss company was used for this measurement.

EXAMPLE 1

Poly(methyl methacrylate) ($[\eta]=0.56$ measured in methylethylketone (MEK) at 25° C.) of 46 weight portions, benzylmethacrylate of 44 parts by weight, methylmethacrylate of 10 parts by weight, 1-hydroxycyclohexylphenylketone of 0.2 part by weight, and hydroquinone of 0.1 part by weight were heated and mixed at 70° C. to form an original liquid for forming a first layer (a central portion). Poly(methyl methacrylate) ($[\eta]=0.41$ measured in MEK at 25° C.) of 50 parts by weight, methylmethacrylate of 50 parts by weight, 1-hydroxycyclohexylphenylketone of 0.2 parts by weight, and hydroquinone of 0.1 part by weight were heated and mixed at 70° C. to form an original liquid for forming a second layer. Poly(methyl methacrylate) ($[\eta]=0.34$ measured in MEK at 25° C.) of 45 parts by weight, 2,2,3,3,4,4,5,5-octafluoropentylmethacrylate of 35 parts by weight, methylmethacrylate of 20 parts by weight, 1-hydroxycyclohexylphenylketone of 0.2 part by weight, and hydroquinone of 0.1 part by weight were heated and mixed at 70° C. to form an original liquid for forming a third layer (an outer layer portion). The forming apparatus of FIG. 6 was provided with a concentric three-layer composite spinning nozzle. With this apparatus, the three kinds of the original liquids were simultaneously extruded to form a concentric strand fiber in a manner that the refractive indexes of the uncured substances decreased from the center toward the periphery of the strand fiber. During this extrusion, the viscosity of the first layer components was $4.5 \times 10^4$ poises, that of the second layer components was $2.0 \times 10^4$ poises, and that of the third layer components was $2.2 \times 10^4$ poises. The temperature of the composite spinning nozzle was 55° C.

Thereafter, the strand fiber was passed through the mutual diffusion portion of 90 cm in length and the center of a light irradiating portion composed of 12 fluorescent lamps of 120 cm long and output 40 W each equidistantly arranged in a ring shape. At a speed of 50 cm/min, the optical transmission article of 0.50 mm in radius ($r_0$) was pulled by nip rollers. A ratio of discharged quantities of the first, second, and third layers was 1:1:1. The optical transmission article thus produced had distributed refractive indexes of 1.512 at a central portion ($n_0$) and 1.470 at a peripheral portion, and a refractive index distribution constant (g) of 0.52. As shown in FIG. 1, a refractive index distribution of the article substantially approximated the equation (1) in a range of $0.25r_0$ to $0.75r_0$ extending from the center toward the external face of the article.

Both end faces of the optical transmission article were polished to a lens length of 7.2 mm for which an MTF was measured with the grid of 4 line-pairs/mm, and the MTF was 57% at a conjugate length of 15.4 mm. An obtained grid image was clear with minor distortion.

A plurality of the optical transmission articles were employed to form an optical transmission article array having a lens length of 7.1 mm as indicated by the numeral 47 in FIG. 4, an MTF thereof was measured with the grid of 4 line-pairs/mm, and it was found that the MTF was 49% at a conjugate length of 15.4 mm. This optical transmission article array, an LED light source, and a light receiving CCD element were assembled into an image scanner, which produced a high resolution and was able to transmit clear images.

EXAMPLE 2

The original liquid for the first layer of the Example 1 was used as an original liquid for forming a first layer. Poly(methyl methacrylate) ($[\eta]=0.40$ measured in MEK at 25° C.) of 50 parts by weight, methylmethacrylate of 20 parts by weight, benzylmethacrylate of 30 parts by weight, 1-hydroxycyclohexylphenylketone of 0.2 part by weight, and hydroquinone of 0.1 part by weight were heated and mixed at 65° C. to form an original liquid for forming a second layer. The original liquid for the second layer of the Example 1 was used as an original liquid for forming a third layer. Poly(methyl methacrylate) ($[\eta]=0.40$ measured in MEK at 25° C.) of 50 parts by weight, methylmethacrylate of 30 parts by weight, 2,2,3,3-tetrafluoropropylmethacrylate of 20 parts by weight, 1-hydroxycyclohexylphenylketone of 0.2 parts by weight, and hydroquinone of 0.1 part by weight were heated and mixed at 65° C. to form an original liquid for forming a fourth layer, and thereafter the four kinds of original liquids were simultaneously extruded from a concentric four-layer composite spinning nozzle to form a strand fiber in a manner similar to the Example 1. During this extrusion, the viscosity of the original liquid for the first layer was $4.5 \times 10^4$ poises, that of the original liquid for the second layer was $4.0 \times 10^4$ poises, that of the original liquid for the third layer was $2.0 \times 10^4$ poises, and that of the original liquid for the fourth layer was $7.2 \times 10^4$ poises. The temperature of the composite nozzle was 60° C.

Thereafter, similar to the Example 1, the strand fiber was cured to form an optical transmission plastic article having a radius ($r_0$) of 0.48 mm. A ratio of discharged quantities of the first, second, third, and fourth layers was 2:1:1:1. The optical transmission article thus produced had distributed refractive indexes measured with the Interfaco interference microscope of 1.513 at a central portion ($n_0$) and 1.497 at a peripheral portion, and a refractive index distribution constant (g) of 0.53. A refractive index distribution of the article substantially approximated the equation (1), in a range of $0.2r_0$ to $0.8r_0$ extending from the center toward the external face of the article. An MTF measured with a grid of 4 line-pairs/mm, was 60% at a lens length of 7.1 mm and a conjugate length of 14.9 mm. A plurality of the optical transmission articles were employed to form an optical transmission article array in a manner similar to the Example 1. An MTF of the array was 53%. Similar to the image scanner of the Example 1, an image scanner employing this array achieved high resolution and could transmit clear images.

EXAMPLE 3

The original liquid for forming the first layer of the Example 2 was used as an original liquid for forming a fourth layer. The original liquid for forming the third layer of the Example 1 was used as an original liquid for forming a fifth layer. The original liquids for the first to the fifth layers were simultaneously extruded from a concentric composite nozzle in a manner similar to the Example 1 into a strand fiber from which an optical transmission article of 0.48 mm in radius ($r_0$) was obtained in a manner similar to the Example 1.

A ratio of discharged quantities of the first, second, third, fourth, and fifth layers was 3:1:1:1:2. The optical transmission article thus produced had distributed refractive indexes measured with the Interfaco interference microscope of 1.514 at a central portion ($n_0$) and 1.469 at a peripheral portion, and a refractive index distribution constant (g) of 0.57. A refractive index distribution of the article substantially approximated the equation (1) in a range of $0.15r_0$ to $0.85r_0$ extending from the center toward the external face of the article. An MTF of the article was 65% at a lens length of 8.0 mm and a conjugate length of 15.9 mm. An MTF of an array of the optical transmission articles similar to that of the Example 1 was 60% (measured with the grid of 4 line-pairs/mm). An image scanner employing this array produce a high resolution and was able to transmit clear images.

COMPARATIVE EXAMPLE 1

A mixture of 2,2,3,3-tetrafluoropropylmethacrylate ($[\eta]=2.268$ measured in MEK at 25° C.) of 60 parts by weight, methacrylate of 40 parts by weight, 1-hydroxycyclohexylphenylketone of 0.1 part by weight, and hydroquinone of 0.1 part by weight was heated to 80° C., passed through a mixing portion, and extruded from a nozzle of 2.0 mm in diameter. During this extrusion, the mixed substances had a viscosity of $1\times10^4$ poises A strand fiber obtained by the extrusion was heated to 80° C., and passed, for 13 minutes, through a volatilizing portion, through which a nitrogen gas was flowing at 10 liters/min, thereby volatilizing a part of the methylmethacrylate from the surface of the strand fiber. Thereafter, the strand fiber was passed through central part of six very-high pressure mercury lamps of 500 W each equidistantly disposed in a circular shape, and irradiated with light for about 0.5 minutes. The strand fiber was then taken up by nip rollers.

The optical transmission article thus obtained had a radius ($r_0$) of 0.35 mm, distributed refractive indexes measured with the Interfaco interference microscope of 1.441 at a central portion ($n_0$) and 1.427 at a peripheral portion, and a refractive index distribution constant (g) of 0.48. The refractive index distribution of the article approximated the equation (1) in a range of $0.35r_0$ to $0.5r_0$ extending from the center toward the peripheral face of the article. An MTF of the article measured with the grid of 4 line-pairs/mm was 23% at a lens length of 8.0 mm and a conjugate length of 15.9 mm. An obtained image of the grid had a large distortion.

A plurality of the optical transmission articles were assembled into an optical transmission article array in a manner similar the Example 1. An MTF of the array measured with the grid of 4 line-pairs/mm was 13%. An image scanner employing this array achieved very poor resolution and was inappropriate for transmitting images.

EXAMPLE 4

Poly(methyl methacrylate) ($[\eta]=0.45$ measured in MEK at 25° C.) of 50 parts by weight, methylmethacrylate of 40 parts by weight, phenylmethacrylate of 10 parts by weight, 1-hydroxycyclohexylphenylketone of 0.2 part by weight, and hydroquinone of 0.1 part by weight were heated and mixed at 60° C. to prepare an original liquid for forming a first layer. Poly(methyl methacrylate) ($[\eta]=0.40$ measured in MEK at 25° C.) of 48 parts by weight, methylmethacrylate of 40 parts by weight, 2,2,3,3-tetrafluoropropylmethacrylate of 12 parts by weight, 1-hydroxycyclohexylphenylketone of 0.2 part by weight, and hydroquinone of 0.1 part by weight were heated and mixed at 60° C. to prepare an original liquid for forming a second layer. Poly(methyl methacrylate) ($[\eta]=0.34$ measured in MEK at 25° C.) of 40 weight portions, 2,2,3,3,4,4,5,5-octafluoropentylmethacrylate of 40 parts by weight, methylmethacrylate of 20 parts by weight, 1-hydroxycyclohexylphenylketone of 0.2 part by weight, and hydroquinone of 0.1 part by weight were heated and mixed at 60° C. to prepare an original liquid for forming a third layer. These original liquids were simultaneously extruded from a concentric composite nozzles. At this time, the viscosity of the first layer components was $5.0\times10^4$ poises, that of the second layer components was $3.5\times10^4$ poises, and that of the third layer components was $2.4\times10^4$ poises. The temperature of the composite nozzle was 60° C.

A ratio of discharged quantities of the first, second, and third layers was 2:1:1. Similar to the Example 1, the strand fiber thus prepared was diffused and cured into an optical transmission article of $r_0=0.52$. This optical transmission article had distributed refractive indexes measured with the Interfaco interference microscope of 1.495 at a central portion ($n_0$) and 1.461 at a peripheral portion, and a refractive index distribution constant (g) of 0.41 $mm^{-1}$. A refractive index distribution of the article substantially approximated the equation (1) in a range of $0.18r_0$ to $0.75r_0$ extending from the center toward the external face of the product. An MTF of the article was 60% at a lens length of 9.1 mm and a conjugate length of 19.8 mm. An optical transmission article array prepared in a manner similar to the Example 1 had an MTF of 56% (measured with the grid of 4 line-pairs/mm). This array was assembled into an image scanner, which achieved high resolution and could transmit clear images.

EXAMPLE 5

The three kinds of the original liquids used in the Example 4 were employed at a ratio of discharged quantities of first, second, and third layers of 2.2:1:0.8 to form a strand fiber in a manner similar to the Example 4. The strand fiber was cured into an optical transmission article of 0.60 mm in radius ($r_0$) The optical transmission article had distributed refractive indexes measured with the Interfaco interference microscope of 1.494 at a central portion and 1.463 at a peripheral portion, and a refractive index distribution constant (g) of 0.34 mm$^{-1}$. A refractive index distribution of the article substantially approximated the equation (1), in a range of $0.19r_0$ to $0.76r_0$ extending from the center toward the external face of the article. An MTF of the article was 57% at a lens length of 11.3 mm and a conjugate length of 22.1 mm. An MTF of an optical transmission article array formed in a manner similar to the Example 1 was 50% (measured with the grid of 4 line-pairs/mm) at a lens length of 11.3 mm and a conjugate length of 22.1 mm. This array was assembled into an image scanner, which produce a high resolution and was able to transmit clear images.

COMPARATIVE EXAMPLE 2

The three kinds of the original liquids prepared in the Example 4 were employed at a ratio of discharged quantities of first, second, and third layers of 4.0:1.0:3.0 to form a strand fiber in a manner similar to the Example 4. The strand fiber was cured into an optical transmission article of 0.50 mm in radius ($r_0$) The optical transmission article had distributed refractive indexes measured by the Interfaco interference microscope of 1.498 at a central portion and 1.459 at a peripheral portion, and a refractive index distribution constant (g) of 0.46 mm$^{-1}$. A refractive index distribution of the article substantially approximated the equation (1) in a range of $0.30r_0$ to $0.65r_0$ extending from the center toward the external face of the article. An MTF of the article was 35% at a lens length of 8.4 mm and a conjugate length of 16.0 mm. An MTF of an optical transmission article array formed in a manner similar to the Example 1 was 30% at a lens length of 8.4 mm and a conjugate length of 16.0 mm. This array was assembled into an image scanner, which produce a poor resolution, distorted images, and blurred edges.

INDUSTRIAL APPLICABILITY

Compared with an optical transmission article of a prior art of the same kind, the distributed refractive index type optical transmission plastic article of the invention substantially approximates the ideal distribution curve of the equation (1), at least in a range of $0.25r_0$ to $0.75r_0$ from the center of the article, and therefore, without a cutting of the peripheral portion thereof, the article of the invention provides excellent lens characteristics. The optical transmission article of the invention, therefore, is effectively used for a facsimile and an image sensor which require a high resolution.

The optical transmission article of the invention can efficiently be manufactured by concentrically extruding at least three uncured substances into at least three laminated layers.

A plurality of the optical transmission articles can be arranged in a single row or in a plurality of rows to form an optical transmission article array, which may effectively be used as an image transmitting member of a copying machine or of a facsimile. The optical transmission article array is preferable to have a lens length ($Z_n$) between 5 and 15 mm, preferably between 6 and 12 mm, and an image forming length ($T_c$) between 10 and 40 mm, preferably between 13 and 25 mm. With these values, the optical transmission article array may have uniform characteristics, a uniform length, and such a high resolution as an MTF measured with a grid of 4 line-pairs/mm of more than 30%, preferably more than 40%.

We claim:

1. A distributed refractive index type optical transmission plastic article having a circular cross section of a radius $r_0$ and a refractive index distribution which substantially approximates a refractive index distribution curve defined by the following equation (1) at least in a range of $0.25r_0$ to $0.70r_0$ extending from a center axis toward a peripheral face of the optical transmission article:

$$n(r) = n_0\{1 - (g^2/2)r^2\} \qquad (1)$$

where $n_0$ is a refractive index at the center axis of the optical transmission article;

n(r) is a refractive index at a position of radius r away from the center axis of the optical transmission article;

g is a refractive index distribution constant (mm$^{-1}$) of the optical transmission article;

r is a distance (mm) from the center axis toward the peripheral face of the optical transmission article; and $$1.4 \leq n_0 \leq 1.6$$

$$0.4 \leq r_0(mm) \leq 0.6$$

$$0.3 \leq g \ (mm^{-1}) \leq 0.7$$

wherein when a grid image of 4 line-pairs/mm is formed through the optical transmission article on a CCD line sensor and a maximum value $i_{max}$ and a minimum value $i_{min}$ of light quantities of the image are measured, a modulation transfer function (MTF) calculated according to the following equation (2):

$$MTF(\%) = \{(i_{max} - i_{min})/(i_{max} + i_{min})\} \times 100 \qquad (2)$$

is at least 55%.

2. A distributed refractive index type optical transmission plastic article as set forth in claim 1, wherein the refractive index distribution of the optical transmission article substantially approximates the refractive index distribution curve defined by the equation (1) at least in a range of $0.20r_0$ to $0.75r_0$ extending from the center axis toward the peripheral face of the optical transmission article.

3. A method of manufacturing a distributed refractive index type optical transmission plastic article comprising the steps of preparing N ($N \geq 3$) uncured liquid substances having a viscosity between $10^3$ and $10^8$ poises each and refractive indexes n of $n_1 > n_2 > n_3 \ldots n_N$ when cured, concentrically laminating the substances in such a way that the refractive indexes are successively reduced from the center toward the periphery of the laminated substances to form an uncured strand fiber, mutually diffusing the substances between adjacent layers in such a way that the refractive indexes are continuously distributed between the layers, and at approximately the same time, curing the uncured strand fiber.

4. A method of manufacturing a distributed refractive index type optical transmission plastic article as set forth in claim 3, wherein the uncured liquid substances are made of a mixture of poly(methyl methacrylate) and radical polymeric vinyl monomers.

5. An optical transmission article array comprising an assembly of a plurality of distributed refractive index type plastic optical transmission articles arranged in a single line or a plurality of lines, said distributed refractive index type optical transmission plastic articles each having a circular cross section of a radius $r_0$ and a refractive index distribution which substantially approximates a refractive index distribution curve defined by the following equation (1) at least in a range of $0.25r_0$ to $0.70r_0$ extending from a center axis toward a peripheral face of the optical transmission article:

$$n(r) = n_0\{1 - (g^2/2)r^2\} \quad (1)$$

where $n_0$ is a refractive index at the center axis of the optical transmission article;

n(r) is a refractive index at a position of radius r away from the center axis of the optical transmission article;

g is a refractive index distribution constant (mm$^{-1}$) of the optical transmission article;

r is a distance (mm) from the center axis toward the peripheral face of the optical transmission article; and $$1.4 \leq n_0 \leq 1.6$$

$$0.4 \leq r_0 \text{ (mm)} \leq 0.6$$

$$0.3 \leq g \text{ (mm}^{-1}) \leq 0.7$$

wherein when a grid image of 4 line-pairs/mm is formed through the optical transmission article on a CCD line sensor and a maximum value $i_{max}$ and a minimum value $i_{min}$ of light quantities of the image are measured, a modulation transfer function (MTF) calculated according to the following equation (2):

$$MTF(\%) = \{(i_{max} - i_{min}(i_{max} + i_{min})\} \times 100 \quad (2)$$

is at least 55%.

6. An optical transmission article array as set forth in claim 5, wherein said array has a lens length (Z) between 5 and 15 mm and an image forming length (Tc) between 10 and 40 mm.

7. An optical transmission article array as set forth in claim 5 or 6, wherein the array of the optical transmission articles has a modulation transfer function (MTF) of at least 40%.

* * * * *